Aug. 26, 1952  J. E. APPLEWHITE  2,608,036
DIAMOND-CHARGED SAW BLADE
Filed Feb. 28, 1951
Fig. 1.
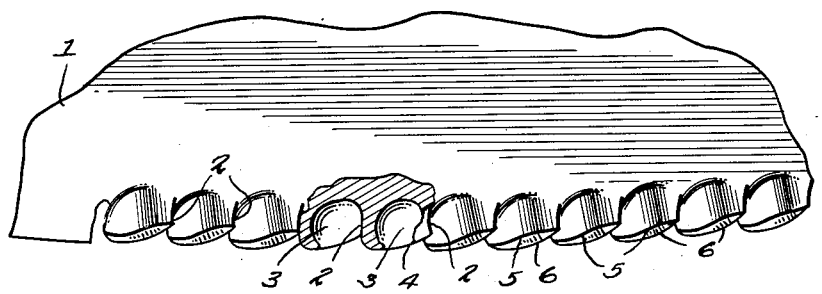
Fig. 2.
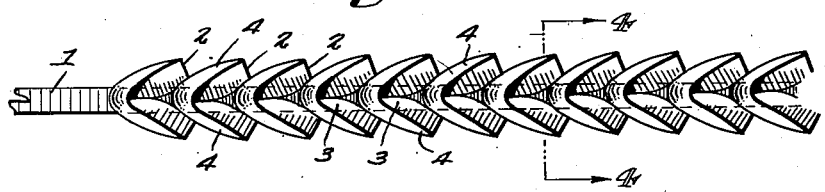
Fig. 3.
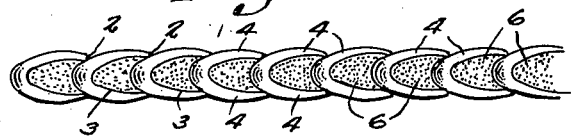
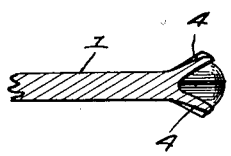
Fig. 4.
J. E. Applewhite
INVENTOR
BY C.A.Snow&Co.
ATTORNEYS Patented Aug. 26, 1952

2,608,036

UNITED STATES PATENT OFFICE 2,608,036

DIAMOND-CHARGED SAW BLADE

Jesse E. Applewhite, Laredo, Tex.

Application February 28, 1951, Serial No. 213,183

2 Claims. (Cl. 51—206)

This invention relates to diamond-charged saws, and more particularly has reference to a means for charging the peripheral edge of a saw disc or blade with diamond bort in a novel and improved manner.

By way of background, it may be pointed out that commonly, the method of charging a saw disc that is commonly employed in the art, is to cut nicks in the peripheral edge of the disc, at spaced intervals, the nicks being cut inwardly from said peripheral edge at an angle of approximately thirty degrees from lines drawn radially of the disc. In other words, if one were looking down on the edge of the conventionally charged disc, the nicks would appear at spaced intervals in perpendicular relation to the side surfaces of the disc. However, when viewing the conventional disc inside elevation, the nicks would appear at an angle of approximately thirty degrees relative to a radius of the saw disc.

Following the conventional method, after a saw blade or disc is nicked as stated, it is filled with diamond bort. The edge of the saw is then rolled for the purpose of holding the diamond in place.

This conventional method has been found to be not entirely satisfactory. In the first instance, the nicks can be closed for the purpose of holding the diamond bort only by rolling the edge of the disc, and it will be obvious that this does not effect sufficient closure of the ends of the nicks, that open on the side surfaces of the saw disc. As a result, it is difficult to give full efficiency to the nicks in retaining therein the diamond bort, and this naturally detracts from the efficiency of the saw itself when in use.

Accordingly, I have devised a new means of charging a saw disc with diamond bort, wherein these difficulties will be obviated. Additionally, the construction devised, and which is the subject of the present application, has the added benefit, I believe, of improving the cutting action of the completed saw disc.

It is an important object of the present invention, in this connection, to provide a means for charging a saw disc with diamond bort that will be efficient in retaining the bort, and which will improve the cutting action of the completed saw disc or blade.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Figure 1 is a fragmentary side view in elevation of a saw blade at the completion of the nicking operation carried out in accordance with the invention.

Fig. 2 is a fragmentary edge view of the blade illustrated in Fig. 1.

Fig. 3 is a fragmentary edge view of the saw blade after the insertion of the diamonds and in its completed form.

Fig. 4 is a transverse sectional view taken substantially on the line 4—4 of Fig. 2.

Referring to the drawings in detail, the reference numeral 1 designates a conventional saw blade that is generally of very thin material and which, for the purpose of being charged with diamond bort or dust, must be nicked peripherally.

As a first step in the manufacture of the saw blade, I form in the cutting edge thereof closely spaced relatively short longitudinal nicks or cuts 2. These extend inwardly from the cutting edge of the saw blade substantially parallel to and midway between opposite sides of the saw blade.

As a next step in the operation, one end of each nick or cut is spread laterally of the saw blade to form a series of V-shaped dust receptacles having dust pockets 3 flanked by the side walls 4 of the receptacles, said side walls meeting at the base of the V-shaped receptacles midway between opposite sides of the saw blade 1, and diverging outwardly beyond the opposite sides of said saw blade, as readily seen in Fig. 2.

The desirable rake to the saw teeth is thus automatically achieved the outer or top surfaces of the walls 4 will incline as at 5 (Fig. 1) due to the spreading of said walls 4.

The pockets of the V-shaped receptacles are now filled with diamond dust or bort 6, and the side walls 4 are pressed toward each other so as to substantially encircle the bort 6.

The outer or free ends of the side walls 4, when pressed inwardly toward the saw blade, straddle the base of the next adjacent V-shaped receptacle, and engage said base as readily seen in Fig. 3 so as to close all the pockets.

The closing of the pockets is readily accomplished by applying pressure in any suitable manner against the side surfaces of the saw blade. This effectively closes the open sides of the pockets, so that in use, possibility of the diamond dust dropping out of the sides of the pockets is effectively reduced to a minimum.

What is claimed is:

1. A diamond-charged saw blade formed with a series of closely spaced V-shaped receptacles the apices of which are located midway between opposite sides of the saw blade and the side walls of which curve inwardly and engage the opposite sides of adjacent receptacles adjacent the apices thereof.

2. A diamond-charged saw disc having a circumferential series of V-shaped abrasive receptacles the apex of each of which is disposed midway between opposite sides of the saw disc, and the side walls of each receptacle straddling the apex of the next adjacent receptacle, said side walls being clamped against said adjacent receptacle adjacent the apex thereof, and said receptacles being filled with abrasive.

JESSE E. APPLEWHITE.

REFERENCES CITED

The following references are of record in the file of this patent:

UNITED STATES PATENTS

| Number | Name | Date |
|---|---|---|
| 1,712,034 | Fromm | May 7, 1929 |
| 2,408,148 | Longbotham | Sept. 24, 1946 |